(12) United States Patent
Shuen

(10) Patent No.: US 6,247,881 B1
(45) Date of Patent: Jun. 19, 2001

(54) CONNECTING SEAT FOR TYING BAR OF CARGO PLATFORM OF SMALL TRUCK

(75) Inventor: Shun-Tian Shuen, San Chung (TW)

(73) Assignee: Janchy Enterprise Co., Ltd., San Chung (TW)

( * ) Notice: Subject to any disclaimer, the term of this patent is extended or adjusted under 35 U.S.C. 154(b) by 0 days.

(21) Appl. No.: 09/478,085

(22) Filed: Jan. 6, 2000

(51) Int. Cl.$^7$ ...................................................... B60P 7/08
(52) U.S. Cl. .......................... 410/106; 410/101; 410/110
(58) Field of Search .................................. 410/101, 106, 410/110, 116; 296/41, 43; 248/499

(56) References Cited

U.S. PATENT DOCUMENTS

| | | | |
|---|---|---|---|
| 5,476,349 | * 12/1995 | Okland | 410/106 |
| 5,873,688 | * 2/1999 | Wheatley | 410/106 |
| 5,904,458 | * 5/1999 | Bundy | 410/106 |
| 5,997,227 | * 12/1999 | Bundy | 410/106 |

* cited by examiner

Primary Examiner—Stephen T. Gordon
(74) Attorney, Agent, or Firm—Bacon & Thomas, PLLC

(57) ABSTRACT

Connecting seat for tying bar of cargo platform of small truck, including a connecting plate, a connecting board and a pivot rod and an elongated circular bar. Each end of the connecting plate has an insertion section having equal dimension and formed with two circular holes, whereby different types of pivot rods can be connected therewith by screws without distinguishing left or right side. A lateral side of the connecting plate is integrally formed with a connecting board disposed with two arch hook sections on two sides for mounting on different types of stopper boards of cargo platforms of small trucks. The pivot rod is formed with an irregular decorative recess tracks on the surface for a corresponding decorative plate with freely designed stripes and pattern to lock thereon to achieve a beautifying decorative effect. The other end of the pivot rod is formed with a fitting section for fitting with the elongated circular bar. The same connecting seat can be firmly locked on any of four corners of two sides of the cargo platform of the small truck without distinguishing left side or right side. In addition, the connecting seat also achieves a beautifying and decorative effect for the truck body.

3 Claims, 6 Drawing Sheets

CONNECTING SEAT FOR TYING BAR OF CARGO PLATFORM OF SMALL TRUCK

BACKGROUND OF THE INVENTION

The present invention relates to a connecting seat for a tying bar of cargo platform of small truck which can be firmly locked on any of four corners of two sides of the cargo platform of the small truck without distinguishing between the left side or the right side. In addition, the connecting seat also achieves a beautifying and decorative effect for the truck body.

A conventional small truck has a cargo platform. The periphery of the cargo platform is mounted with folding stopper boards to prevent the cargo from dropping during transferring. The outer face of each stopper board is disposed with several small-size hook sections. Alternatively, a connecting seat, composed of a connecting plate, connecting board and pivot rod, is integrally disposed on each lateral side of the cargo platform. By means of a rope or a rubber belt, the cargo can be repeatedly tied and firmly fixed.

With respect to the hook section, in order to ensure that the cargo is firmly tied, the rope or rubber belt is repeatedly hooked on the hook sections. However, the hook section is a semicircular structure so that the area supporting the rope or rubber belt is very small and the rope or rubber belt tends to loosen from the hook section. This may lead to an accident.

With respect to an integrally formed connecting seat, the connecting plate cannot be separately assembled so that each lateral side of the cargo platform needs two connecting seats in different directions.

SUMMARY OF THE INVENTION

It is therefore a primary object of the present invention to provide a connecting seat for a tying bar of cargo platform of small truck, including a connecting plate, a connecting board, a pivot rod and an elongated circular bar. Different types of pivot rods can be connected with the connecting plate by screws without distinguishing between the left or right side. A lateral side of the connecting plate is integrally formed with a connecting board disposed with two hook sections on two sides. The pivot rod is disposed with a corresponding decorative plate with freely designed patterns. The other end of the pivot rod is formed with a fitting section for fitting with the elongated circular bar to form a tying bar mounted on the stopper boards of two sides of the cargo platform of the small truck. The same connecting seat can be firmly locked on any of four corners of two sides of the cargo platform of the small truck without distinguishing between the left side or right side. In addition, the connecting seat also achieves a beautifying and decorative effect for the truck body.

The present invention can be best understood through the following description and accompanying drawings wherein:

DETAILED DESCRIPTION OF THE PREFERRED EMBODIMENTS

Figure 1:
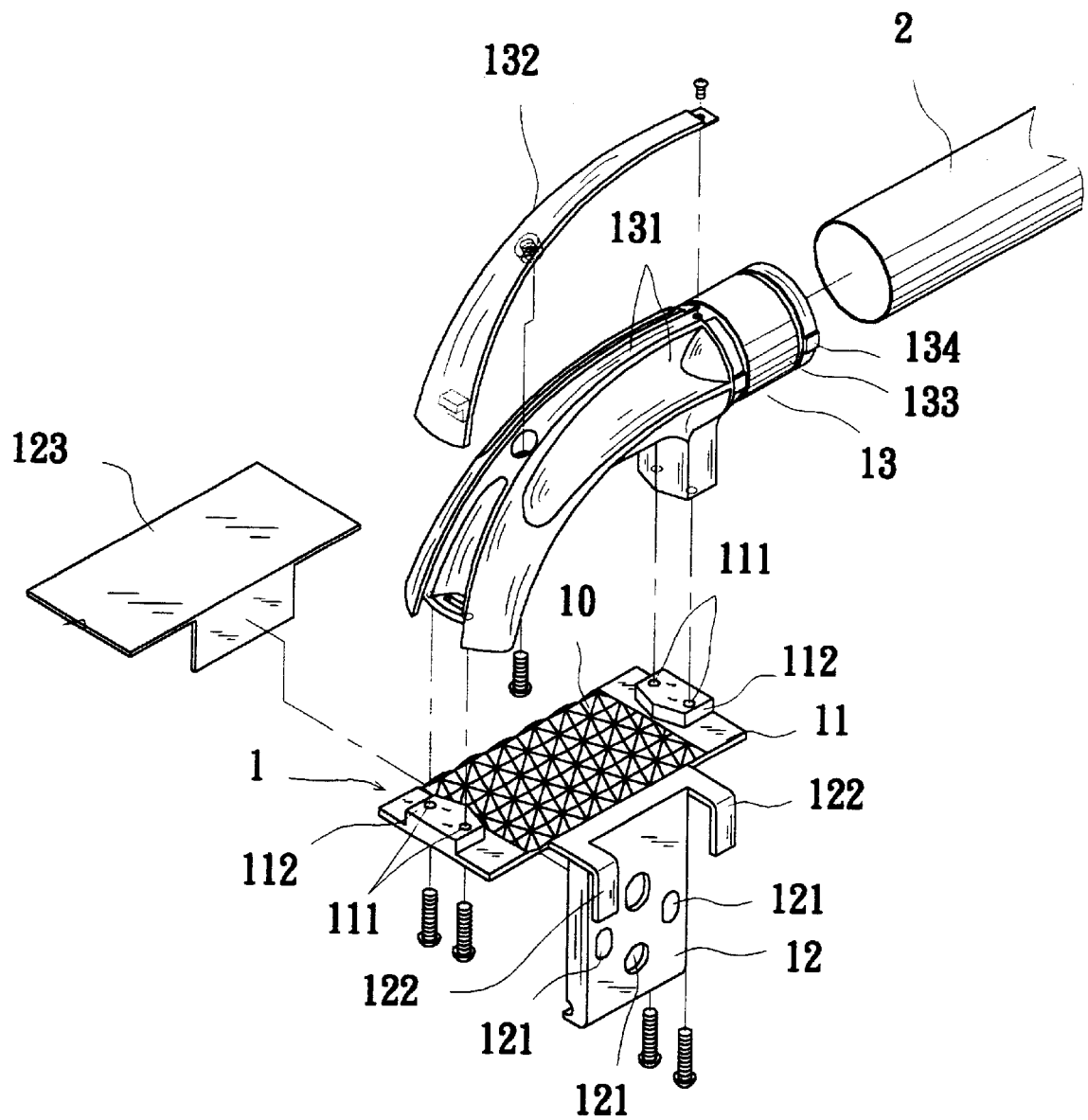
FIG. 1 is a perspective exploded view of the present invention.
Figure 2:
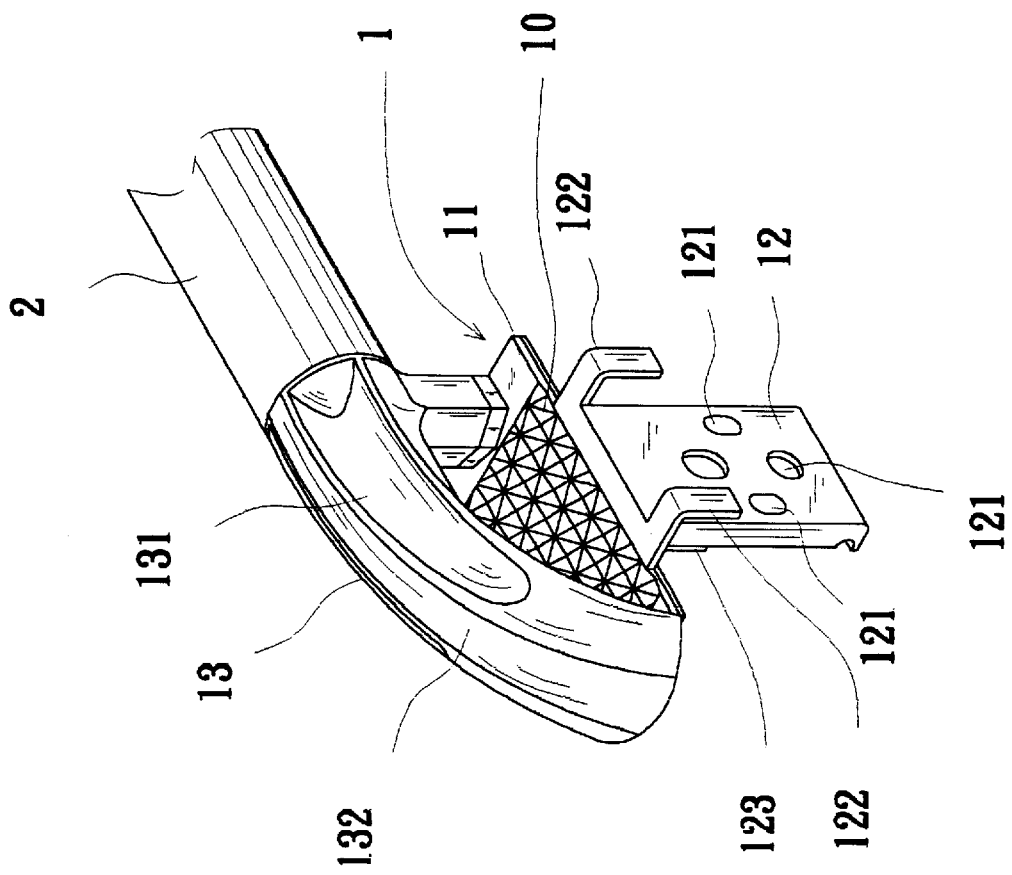
FIG. 2 is a perspective assembled view of the present invention.

Please refer to FIGS. 1 and 2. The present invention is composed of a connecting seat 1 and a cooperative elongated circular bar 2.

As shown in FIG. 1, the surface of the connecting plate 11 is formed with lozenge projecting stripes for decoration. Each end of the connecting plate 11 has an insertion section 112 having the same dimensions and formed with two circular holes 111, whereby a pivot rod 13 can be connected therewith by screws without distinguishing between the left or right side. A lateral side of the connecting plate 11 is integrally formed with a connecting board 12 formed with multiple through holes 121 and disposed with two hook sections 122. The inner face of the connecting plate adjacent to the connecting board 12 is additionally disposed with a rubber-made soft pad 123 for firmly assembling the connecting seat 1 with the stopper board without swinging. The pivot rod 13 is arched and formed with irregular decorative recess tracks 131 on the surface. A corresponding decorative plate 132 is locked on one of the recess tracks 131. The other end of the pivot rod 13 is formed with a fitting section 133 for fitting with the elongated circular bar 2. The circumference of the end is formed with protuberances 134 for tightening the circular bar 2 without loosening.

Figure 3:
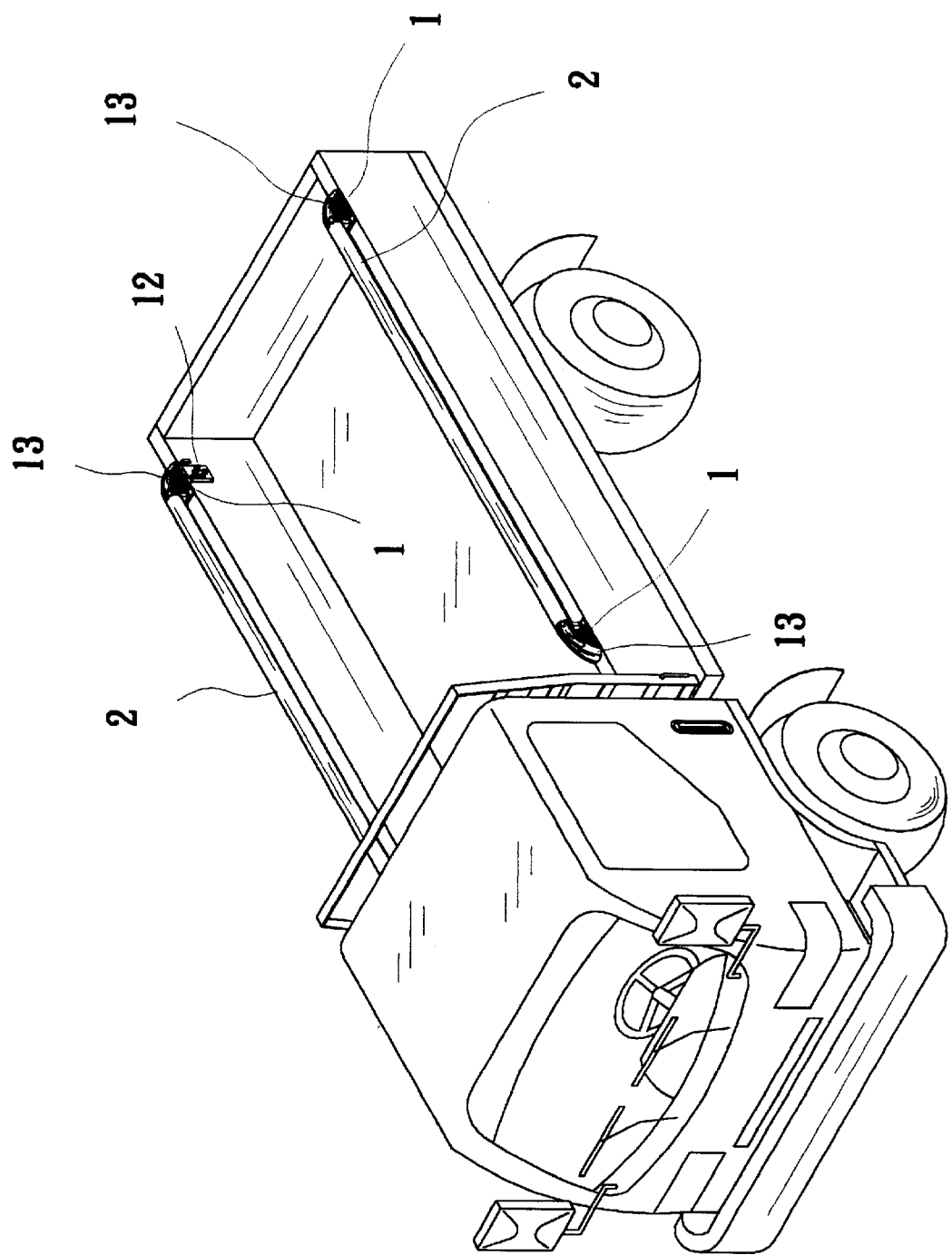
FIG. 3 shows the application of the present invention to the stopper boards of a small truck.

According to the above arrangement, in use, the connecting seat 1 is mounted on upper side of the stopper board with the connecting board 12 attaching to inner wall of the stopper board. Several screws are respectively screwed through the through holes 121 of the connecting board into the stopper board so as to fix the connecting seat on the stopper board as shown in FIG. 3. Accordingly, when placing cargoes on the cargo platform of the small truck, a rope or a rubber belt can be used to tie up the cargoes and wound around the circular bar 2 and hooked on the hook sections 122 of the connecting board 12. Therefore, the cargoes can be firmly fixed on the cargo platform without freely moving so that the safety can be ensured.

Figure 4:
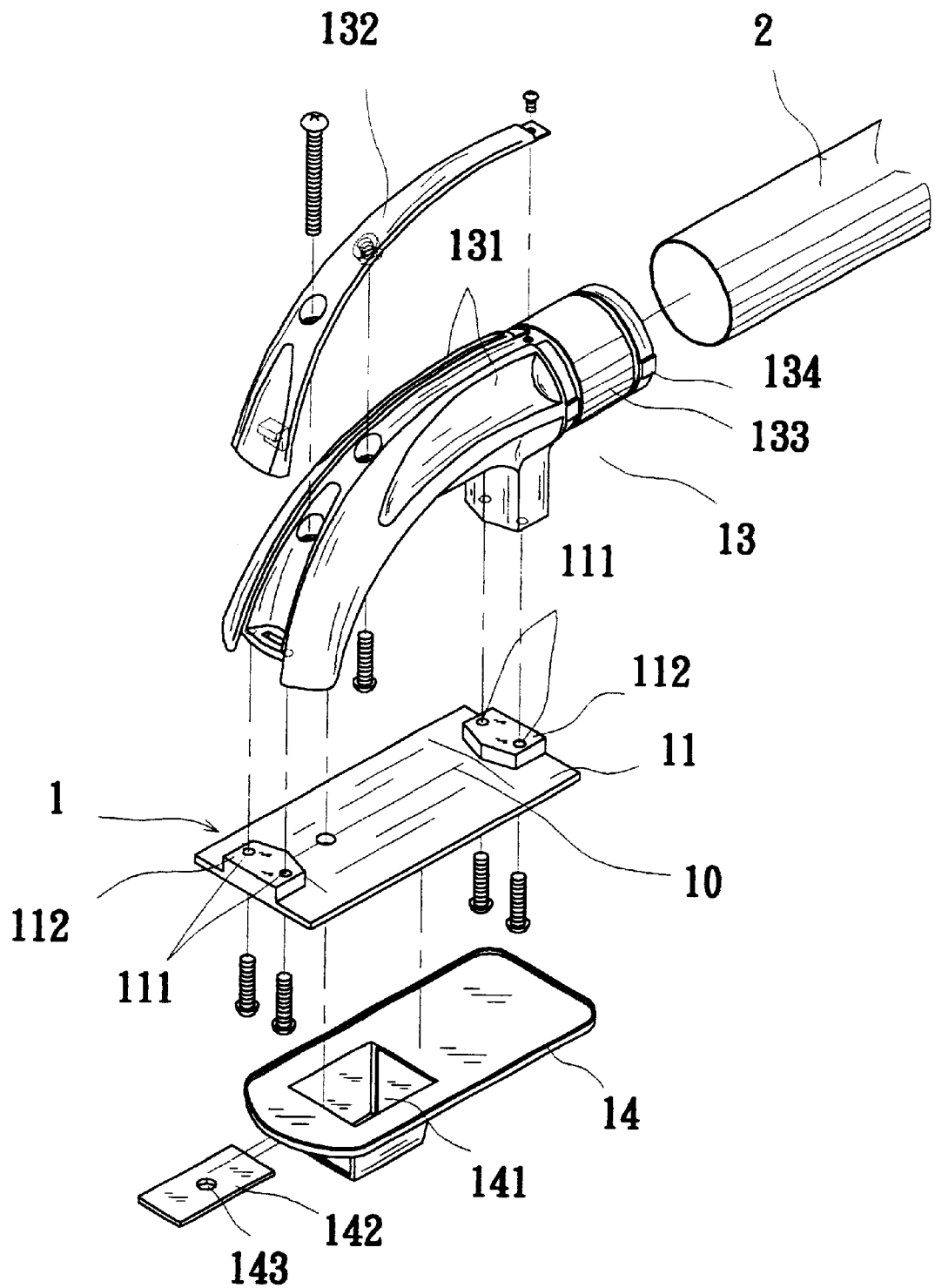
FIG. 4 is a perspective exploded view of another embodiment of the present invention.
Figure 5:
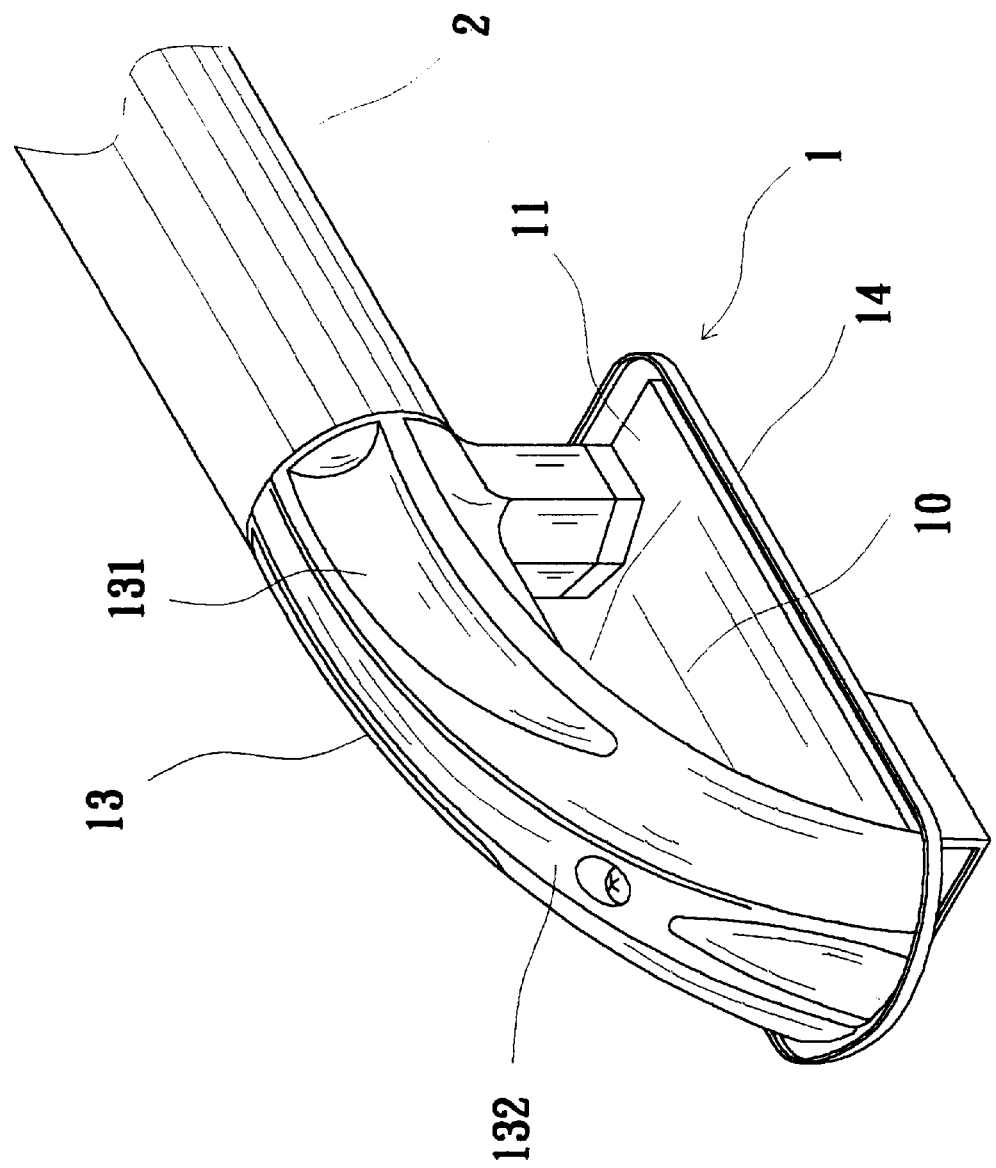
FIG. 5 is a perspective assembled view of the other embodiment of the present invention.
Figure 6:
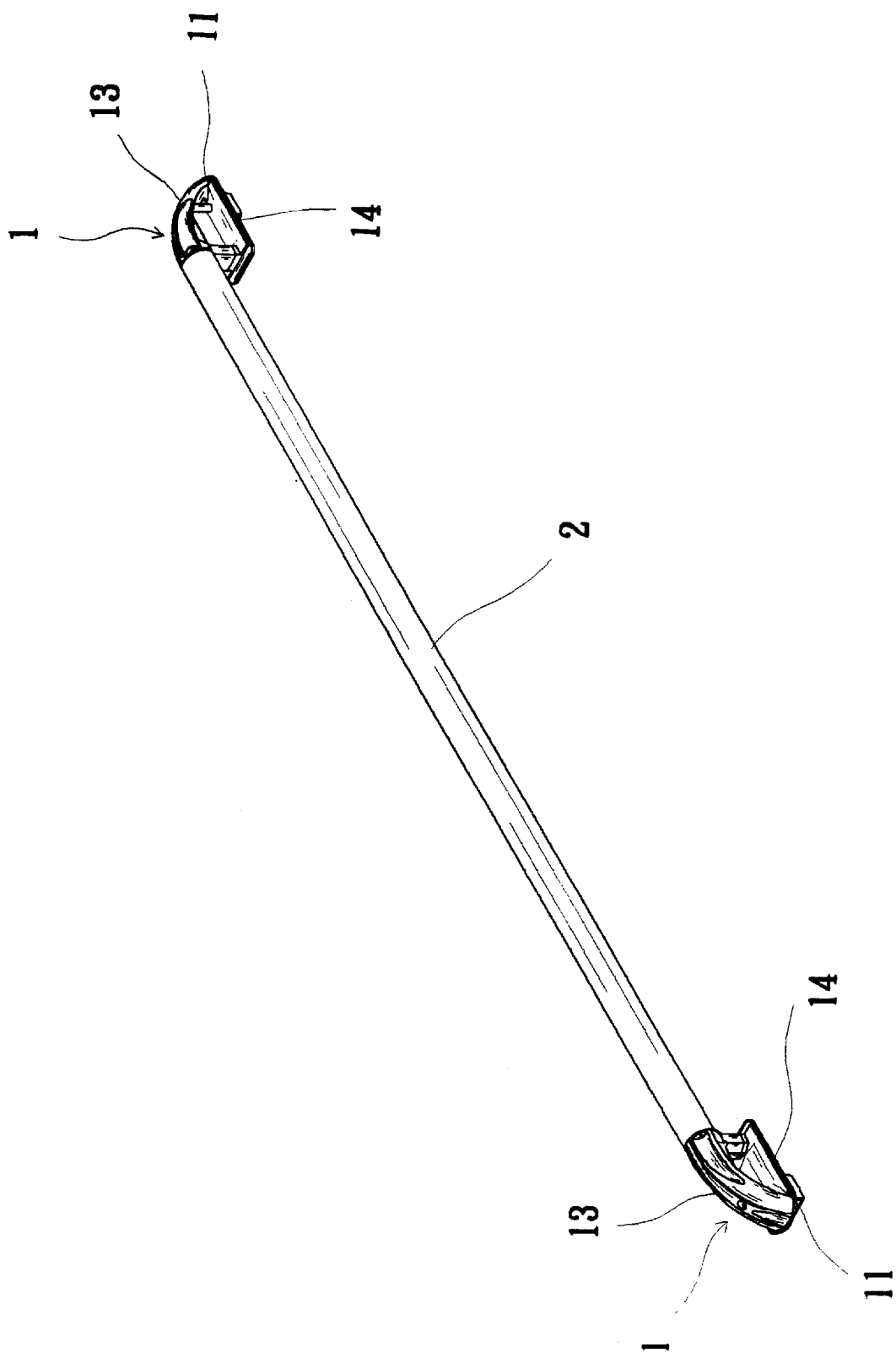
FIG. 6 is a perspective assembled of the entire tying bar of the present invention according to FIG. 5.

FIGS. 4, 5 and 6 shows another embodiment of the present invention, in which as shown in FIG. 4, the center of the surface of the connecting seat 1 is formed with slightly sharp projecting decorative stripe 10. Two ends of the connecting seat 1 are respectively disposed with two insertion sections 112 each of which is formed with two circular holes 111, whereby by means of screws, the connecting seat 1 is integrally connected with the pivot rod 13. The bottom face of the connecting plate 11 is connected with a base board 14 formed with a cavity 141. Two opposite sides of the cavity 141 are open for receiving a pad member 142 formed with a thread hole 143. By means of screws, the connecting plate 11, the base board 14 and the pivot rod 13 are connected with each other. The cavity 141 of the base board 14 enables the connecting seat to be connected with different types of stopper boards of cargo platforms of small trucks.

The above embodiments are only used to illustrate the present invention, not intended to limit the scope thereof. Many modifications of the above embodiments can be made without departing from the spirit of the present invention.

What is claimed is:

1. A connecting seat system for a tying bar of a stopper board of a cargo platform of a small truck, comprising:

a connecting plate, a connecting board, a pivot rod and an elongated circular bar, a connecting seat mounted on the stopper board of the cargo platform, said connecting seat having a top surface supporting the connecting plate, said connecting plate being formed with lozenge projecting stripes, each end of the connecting plate having an insertion section formed with two circular holes, whereby different types of pivot rods can be connected therewith by screws without distinguishing between a left or right side of the platform, a lateral side of the connecting plate being integrally formed with the connecting board and the connecting board having multiple through holes and two hook sections, the pivot rod being arched and formed with irregular decorative recess tracks on an outside surface thereof, a corresponding decorative plate being locked on one of the recess tracks, an end of the pivot rod being formed with a fitting section for fitting with the elongated circular bar, and the circumference of the end of the pivot rod being formed with protuberances for tightly engaging the circular bar.

2. The connecting seat system as claimed in claim 1, wherein an inner face of the connecting plate adjacent to the connecting board rests on a rubber-made soft pad for firmly assembling the connecting seat with the stopper board.

3. A connecting seat system for a tying bar of a stopper board of a cargo platform of a small truck, comprising:

a connecting plate, a pivot rod and an elongated circular bar, a connecting seat mounted on the stopper board of the cargo platform, said connecting seat having a top surface supporting the connecting plate each end of the connecting plate having an insertion section formed with two circular holes, whereby different types of pivot rods can be connected therewith by screws without distinguishing between the left or right side of the platform, the pivot rod being arched and formed with irregular decorative recess tracks on an outside surface thereof, a corresponding decorative plate being locked on one of the recess tracks, an end of the pivot rod being formed with a fitting section for fitting with the elongated circular bar, the circumference of the end of the pivot rod being formed with protuberances for tightly engaging the circular bar, and wherein the connecting plate is connected with a base board formed with a cavity, whereby the connecting seat can be connected with the different types of stopper boards of cargo platforms of small trucks.

\* \* \* \* \*